United States Patent [19]

Kooi et al.

[11] 4,112,584
[45] Sep. 12, 1978

[54] TELESCOPE LEVEL ADJUSTING MEANS

[75] Inventors: J. Peter E. Kooi, Succasunna; Stephen Vagyoczky, Landing, both of N.J.

[73] Assignee: Keuffel & Esser Company, Morristown, N.J.

[21] Appl. No.: 831,845

[22] Filed: Sep. 9, 1977

[51] Int. Cl.² ........................ G01C 1/02; G01C 9/28
[52] U.S. Cl. .................................. 33/292; 33/88; 33/275 R; 33/284
[58] Field of Search ............... 33/290, 292, 384, 385, 33/386, 387, 388, 389, 275 R, 282, 88, 280; 356/138

[56] References Cited

U.S. PATENT DOCUMENTS

| 1,278,148 | 9/1918 | Heusser | 33/385 X |
| 1,882,523 | 10/1932 | Rothweiler | 33/292 |
| 2,132,171 | 10/1938 | Langsner | 33/282 |
| 2,941,297 | 6/1960 | Howley et al. | 33/292 |
| 2,948,066 | 8/1960 | Rosenholm | 33/384 X |

FOREIGN PATENT DOCUMENTS

| 1,174,836 | 11/1958 | France | 33/384 |
| 174,335 | 9/1906 | Fed. Rep. of Germany | 33/385 |

Primary Examiner—William D. Martin, Jr.
Attorney, Agent, or Firm—Lionel N. White

[57] ABSTRACT

Fine adjustment of a surveying instrument telescope reference spirit level is effected by rotating the bubble vial of the level about an axis which is slightly angularly displaced from the longitudinal axis of the vial.

7 Claims, 3 Drawing Figures

TELESCOPE LEVEL ADJUSTING MEANS

BACKGROUND

Telescopic sighting instruments, such as employed in surveying transits, normally include a spirit or "bubble" level device as a means for establishing a horizontal line of sight in the instrument. Adjusting means are normally provided to enable any necessary correction in the attitude of the bubble vial with respect to the telescope in order to ensure an accurate alignment of the bubble "horizon" with the telescope line of sight.

Typical of such a telescope/level assembly is that shown in U.S. Pat. No. 2,774,275 which includes a support for mounting the bubble vial to the body of the telescope by means of posts located at opposite ends of the vial. Threaded means associated with one such supporting post are usually employed to raise or lower that end of the bubble vial and thus effect the attitude adjustment.

Although simple and straightforward in manufacture and operation, such conventional leveling means nonetheless require highly precise and expensive parts, such as finely threaded adjustment screws. Further, these levels remain particularly susceptible to the effects of weather and accidental mishandling, since, being mounted directly to the telescope body, they are of necessity exposed to such hazards.

SUMMARY

Telescope level adjusting means of the present invention may be economically constructed of moderately precise mechanical elements, yet provide a sufficient sensitivity to be utilized in most surveying instruments in use today.

Unlike the noted conventional leveling assemblies, the leveling means of the present invention is affixed to the sighting telescope by means located at one end of the telescope tilting axle and is, therefore, capable of rotating coaxially with the telescope rather than being relegated to a path of revolution about the axle in the manner of previous levels commonly mounted upon the telescope body. Such a structure provides a particularly compact arrangement in which the leveling mechanism may be enclosed against weather and mishandling by simple body cover plates which are associated with many present day surveying instruments. Viewing and adjustment access to the level device thus enclosed may be readily effected through transparent viewing windows and sealable access ports.

The telescope level device of the present invention essentially comprises a common bubble vial which, encased within the usual cylindrical protective sleeve, is supported at the opposite ends of such cylinder by a pair of pivot elements at least one of which is offset from the longitudinal axis of the bubble vial to thereby establish an axis of rotation which is situated at a slight angle to the vial axis. Rotation of the bubble vial between these pivot points is substantially about the longitudinal axis of the vial, yet there is imparted a displacement vector which raises or lowers at least one end of the vial with respect to the horizontal plane and effects the desired adjustment between the level and the telescope to which it is affixed.

The level assembly may further include a lever arm extending substantially perpendicular to the longitudinal axis of the vial, and screw means acting upon the lever to effect the noted rotary movement of the bubble vial. As incorporated in a preferred embodiment of the invention, i.e. in a transit surveying instrument wherein the leveling device is enclosed against hazards as earlier described, the lever arm displacement is arranged to be in the direction parallel to the axle to which the level device is mounted. As a result, the level adjustment may be made by means of an advancing screw which is manipulated through a single access port in the enclosing side cover plate of the instrument.

DRAWINGS

DESCRIPTION OF A PREFERRED EMBODIMENT

Figure 1:
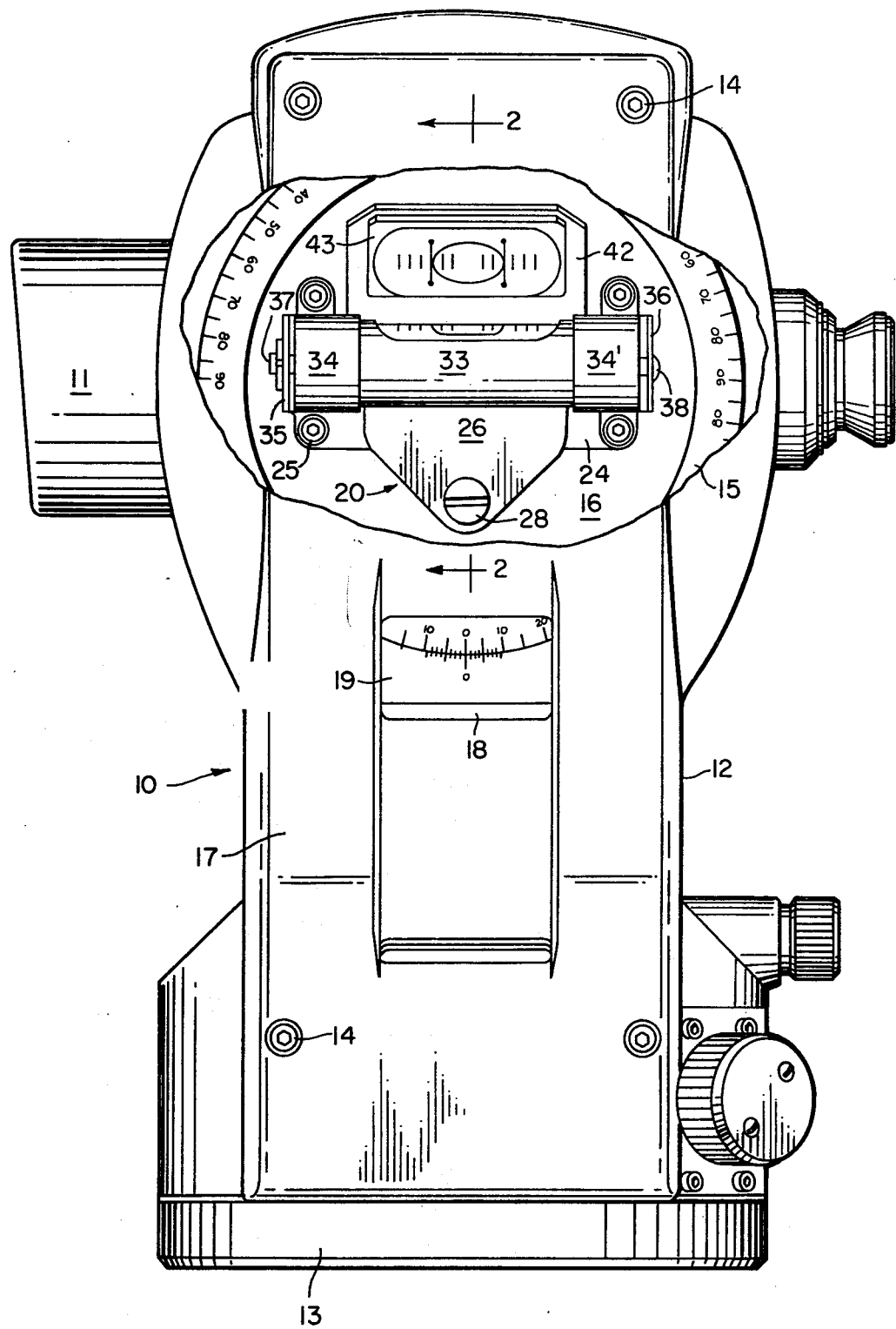
FIG. 1 is a side elevation of a typical surveying instrument with a portion of the alidade cover plate cut away to reveal an embodiment of leveling means according to the present invention.

A telescope level assembly according to the present invention may be seen in FIG. 1 in the partial cutaway view of a surveying instrument, such as a transit 10, which comprises an alidade including telescope 11, supporting standards 12, and baseplate 13 which provides horizontal rotation for telescope 11 in the usual manner. Rotation of the telescope in the vertical plane is accommodated by means of telescope axle 21 (FIG. 2) which is journaled for rotation in bearing 23 affixed to standard 12.

Figure 2:
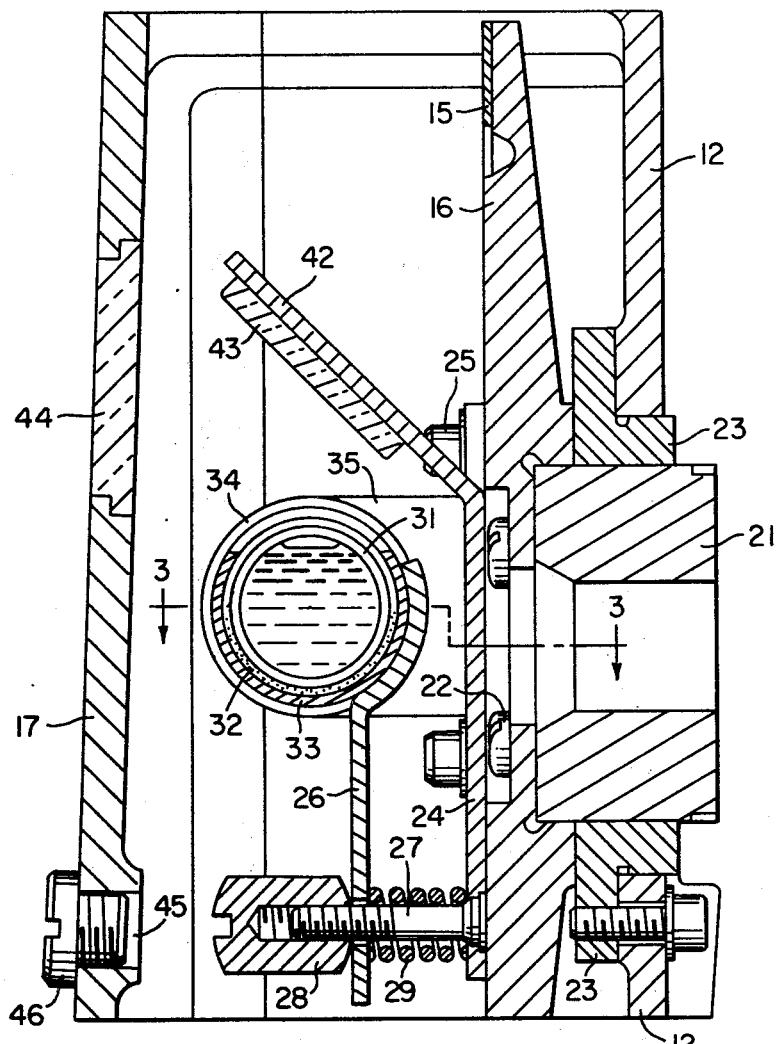
FIG. 2 is a sectional view of the leveling means taken along 2—2 in FIG. 1.

Also seen in FIG. 2 is circle support plate 16 which is affixed to the end of axle 21, as by screws 22, to rotate with telescope 11 about the axis of axle 21. Mounted on plate 16 is the vertical circle 15 of the instrument which is graduated in the usual manner to indicate the relative attitude of the line of sight with respect to the vertical spindle axis. The precise indication of such attitude is indicated by the vernier scale of index plate 19 affixed to alidade standard 12.

The transit instrument depicted as utilizing the embodiment of the present invention is one in which the vertical circle 15 and the horizontal azimuth circle (not shown) are enclosed against the effects of dust and weather by means of alidade standard cover plate 17. Transparent window 18 situated in cover plate 17 is provided for observation of the coincidence of the graduations of vertical circle 15 and vernier index plate 19.

The level assembly of the present invention, generally shown at 20 (FIG. 1), provides a ready means for assessing the horizontal attitude of the line of sight of telescope 11 and thus serves as the telescope level of the surveying instrument. The arrangement of the invention provides, in particular, means for simple and accurate field adjustment between the telescope line of sight and the "horizon" of the spirit level.

Unlike previous telescope levels employed in surveying instruments, the level of the present invention is not exposed to the elements as a result of being mounted directly upon the telescope. Rather it is afforded the same protection as the circle members of the instrument by its being enclosed within the housing of the alidade standard. As will be noted, the level is nonetheless readily accessible for field adjustment and visual observation.

Figure 3:
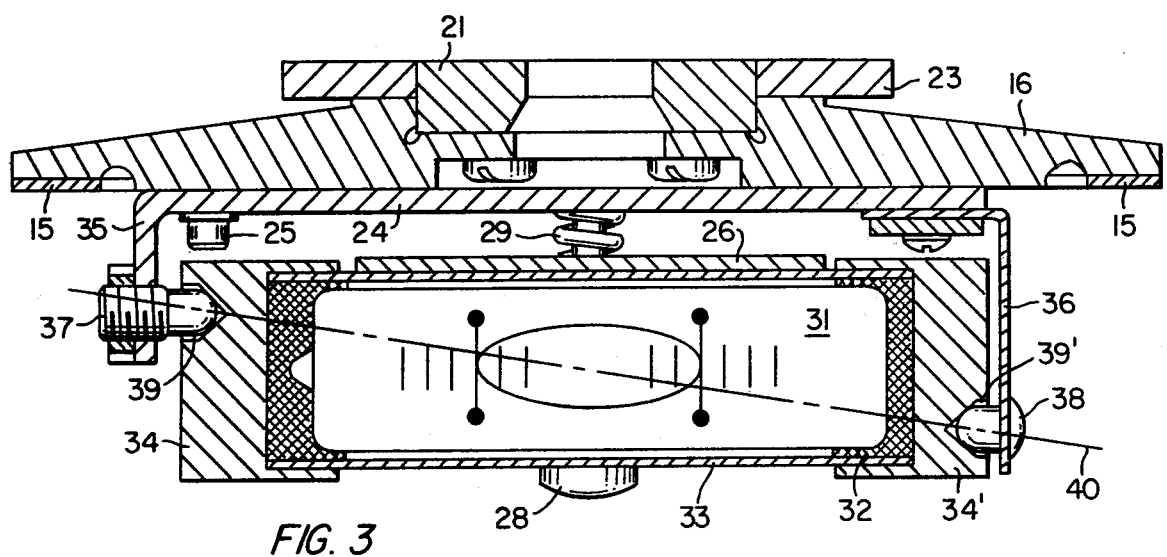
FIG. 3 is another sectional view of the leveling means taken along 3—3 of FIG. 2.

As may be seen more clearly in FIGS. 2 and 3, the bubble vial assembly of the level includes a common graduated fluid vial 31 which is supported by resilient cushioning material 32 within a protective sleeve 33 of durable material such as steel or aluminum. End caps 34, 34' complete the enclosure of the bubble vial and provide, in seats 39, 39'; means for pivotally mounting the bubble vial assembly for rotation generally about the longitudinal axis of vial 31. As will be discussed in greater detail, seats 39, 39' are so located in end caps 34, 34' as to provide an axis of rotation 40 therebetween which is disposed at a slight angle to the longitudinal axis of vial 31, thereby effecting the means of adjustment of the bubble vial with respect to the horizon.

Level assembly 20 further comprises a baseplate 24 of which one end portion forms an upstanding flange 35 which threadedly accommodates a set screw 37, one spherical end of which establishes a rotational pivot in seat 39 of bubble vial assembly end cap 34.

Disposed at the opposite end of the bubble vial assembly and affixed to baseplate 24 to form a second support for the vial assembly is leaf spring flange member 36 to which is affixed a rivet 38, the spherical end of which forms the second rotational pivot in the other seat 39' in cap 34'. The resilience of spring flange member 36 provides a means for firmly supporting the bubble vial assembly for movement about the rotational axis 40 without imparting deleterious stresses on the vial.

Positive rotation of the bubble vial assembly about axis 40 is effected by means of lever member 26, affixed to vial sleeve 33, whose movement is regulated along the length of threaded stud member 27 by the opening forces of compression spring 29 and adjusting nut 28. As will be apparent, rotation of nut 28, in one or the other direction, will effect, through movement of lever 26, a resulting rotation of vial 31 in clockwise or counterclockwise direction (as viewed in FIG. 2) with resulting vertical tilt of the vial.

Level means 20, as thus assembled, is affixed to vertical circle support member 16 by means of bolts 25 and rotates with the telescope about axle 21. Movement of the bubble in level vial 31, resulting from any change in elevation of the longitudinal axis of the vial, may be readily observed through viewing window 44 located in cover plate 17. Such observation of the vial bubble is assisted by means of a plane mirror 43 supported on an extending flange portion 42 of level assembly baseplate 24. Access to adjusting nut 28 is readily effected through a port 45 in cover plate 17 by removal of protective cap screw 46.

The embodiment of the present invention thus far described is one in which pivot seats 39, 39' are situated substantially in a horizontal plane with the longitudinal axis of bubble vial 31 and are disposed on opposite sides of that longitudinal axis. This preferred arrangement provides a device of compact size, yet one which will yield a substantial degree of adjustment in order to accommodate bubble vials of various sensitivity. As will be apparent from an analysis of the geometry of the described embodiment, the extent of adjustment to be obtained from a level device of the present invention is a direct function of the angle established between the axis of rotation 40 of the bubble vial and the longitudinal axis of the vial, and the extent to which the attitude of rotational axis 40 approaches being disposed in a horizontal plane. For example, while maintaining all other proportions of the depicted embodiment of the instant level device, the response of adjustment could be rendered extremely fine merely by disposing seats 39, 39' and their respective pivots 37, 38 in a vertical plane rather than in the horizontal plane as shown. Alternatively, the pivot seats might be moved to an offset or intermediate plane, or they might be located closer to the longitudinal axis of vial 31.

In the depicted preferred embodiment, for example, a satisfying degree of adjustment response, e.g., a displacement of the bubble by one 2mm division upon rotation of nut 28 through about ten degrees, is obtained for a 60mm bubble vial assembly of 30-second sensitivity when level device 20 comprises a lever arm 26 of about 25mm, a stud thread pitch of about 1mm, and a displacement of pivots 37, 38 at about 5mm, respectively, from the longitudinal axis of the bubble vial.

The present level adjusting means may be employed during both manufacture and field use of a surveying instrument with equal precision. In the former procedure the telescope line of sight and the alidade spindle are accurately aligned, respectively, to the horizontal and the vertical, and the precise coincidence of the indices of the vertical circle and index plate scales is established. Level assembly 20 is then made fast to circle support 16 by means of bolts 25 in a substantially bubble-level attitude. Adjusting nut 28 is then rotated to the extent necessary to achieve the precise bubble-level and thus align the bubble horizon with the line of sight of telescope 11. The instrument alidade is then sealed with cover plate 17 by means of bolts 14.

Field adjustment of the telescope level follows the usual steps of leveling baseplate 13 by means of plate levels and leveling feet (not shown) and establishing the coincidence of circle and vernier indices. Any displacement of the bubble in vial 31 from center scale is then remedied by removal of cap screw 46 from alidade cover plate port 45 and insertion of a screwdriver or similar tool to engage and rotate adjusting nut 28 to properly level the vial. Replacement of screw 46 then seals the level and instrument circles and bearings from external environmental conditions.

It should be apparent that the present invention is not limited in its utility to telescope levels, but may be employed wherever fine adjustment of a spirit level is required. The invention may thus be used to advantage as a baseplate level in a surveying, construction, or similar instrument, as well as in arrangements where adjusting movement force is to be applied in other than a horizontal direction. These and other similar embodiments are intended to be within the scope of the present invention as defined in the appended claims.

What is claimed is:

1. Adjustable level means comprising:
 a. a spirit level bubble vial;
 b. means fixedly encompassing at least the end portions of said vial;
 c. a generally U-shaped base member, the upstanding flange portions of which are separated by a distance greater than the combined length of said vial and said vial end portion encompassing means;
 d. pivot means associated with each of said base member flange portions pivotally engaging the respective ones of said vial end portion encompassing means, thereby to support said vial for rotation generally about the longitudinal axis of said vial;
 e. said pivot means being so situated as to establish therebetween a vial rotation axis which is disposed at an angle to the longitudinal axis of said vial, whereby movement of said vial about said rotation axis imparts an angular displacement of said vial longitudinal axis with respect to the horizontal plane.

2. Level means according to claim 1 which further comprises:
   a. a lever arm affixed to said vial end portion encompassing means and extending outwardly therefrom in a direction generally perpendicular to the longitudinal axis of said vial; and
   b. adjusting means capable of imparting incremental movement to the distal end of said lever arm in a direction generally perpendicular to the longitudinal axis of said vial.

3. Level means according to claim 2 wherein said adjusting means comprises a threaded element bearing upon said lever arm distal end and imparting said incremental movement thereto in response to rotation of said threaded element about the axis of the course of said threads.

4. In a geodetic instrument comprising an alidade, the improvement in telescope leveling means which comprises:
   a. a base member mounted to one end of the axle of the telescope of said alidade and disposed substantially perpendicular to said axle;
   b. a pair of flange members outstanding from said base member;
   c. pivot means associated with each of said flange members;
   d. a spirit level bubble vial; and
   e. means mounting said vial longitudinally between said pivot means for rotation substantially about the longitudinal axis of said vial, said mounting means being so situated with respect to said vial axis as to establish an axis of vial rotation which is disposed at an angle to said vial axis, whereby rotation of said vial about said rotational vial axis will impart an angular displacement of the longitudinal axis with respect to the line of sight of said telescope.

5. The improvement according claim 4 wherein said vial mounting means includes means for imparting incremental rotational movement to said vial.

6. The improvement according to claim 5 wherein said means for imparting incremental rotation comprises:
   a. a lever arm member extending from said vial mounting means in a direction substantially perpendicular to said vial longitudinal axis; and
   b. threaded adjusting means extending between said base member and said lever arm member arranged to displace said lever arm member with respect to said base member in response to rotational movement of said threaded adjusting means.

7. The improvement according to claim 6 wherein said threaded adjusting means comprises:
   a. a threaded stud member affixed to said base member and extending outwardly therefrom in a direction substantially parallel to said telescope axle;
   b. resilient means bearing upon said lever arm member and exerting a force thereon urging said lever arm member to movement in a direction substantially parallel to said telescope axle; and
   c. a member threadedly cooperating with said stud member and engaging said lever arm member in such a manner as to restrain the movement thereof urged by said resilient means, whereby rotation of said cooperating member allows or imparts limited incremental movement of said lever arm member with resulting incremental rotation of said vial.

* * * * *